(12) United States Patent
Abe et al.

(10) Patent No.: US 7,944,937 B2
(45) Date of Patent: May 17, 2011

(54) DATA TRANSMISSION APPARATUS EFFICIENTLY USING NETWORK RESOURCES

(75) Inventors: Tatsutoshi Abe, Hamamatsu (JP); Takashi Furukawa, Hamakita (JP); Shoichi Matsumoto, Chofu (JP); Shinsuke Saba, Chofu (JP); Kunihiko Maeda, Chofu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 12/247,110

(22) Filed: Oct. 7, 2008

(65) Prior Publication Data
US 2009/0052447 A1    Feb. 26, 2009

Related U.S. Application Data

(62) Division of application No. 11/077,667, filed on Mar. 11, 2005.

(30) Foreign Application Priority Data

Mar. 11, 2004  (JP) ................................ 2004-068397

(51) Int. Cl.
*H04L 12/28* (2006.01)

(52) U.S. Cl. ........ 370/419; 370/257; 370/255; 370/230; 370/468; 710/29; 710/32; 710/107; 710/310

(58) Field of Classification Search ................... 370/257, 370/255, 230, 468, 498, 419; 710/29, 32, 710/107, 310
See application file for complete search history.

(56) References Cited

U.S. PATENT DOCUMENTS

| 5,225,618 | A | 7/1993 | Wadhams |
| 5,459,842 | A | 10/1995 | Begun et al. |
| 5,668,967 | A | 9/1997 | Olson et al. |
| 5,815,678 | A | 9/1998 | Hoffman et al. |
| 5,825,752 | A | 10/1998 | Fujimori et al. |
| 6,112,289 | A | 8/2000 | Matsuo |
| 6,751,228 | B1 | 6/2004 | Okamura |

(Continued)

FOREIGN PATENT DOCUMENTS

| EP | 1117226 A2 | 7/2001 |
| EP | 1117226 A3 | 6/2003 |

OTHER PUBLICATIONS

Fujimori, Jun-chi, A New Connection Management Architecture for the Next Generation of mLAN, Proceedings of the International AES Conference, Mar. 22-25, 2003, pp. 1-12.

(Continued)

*Primary Examiner* — Huy D Vu
*Assistant Examiner* — Kibrom T Hailu
(74) *Attorney, Agent, or Firm* — Morrison & Foerster LLP

(57) ABSTRACT

A data transmission apparatus connecting to a network consisted of a plurality of data transmission apparatuses comprises a disconnecting device that disconnects a connection established between a transmission plug of a transmitting node and a reception plug of a receiving node, both nodes being connected to the network, an optimization requesting device that requests optimization of transmitting sequences to the transmitting node, a receiver that receives information about a transmission plug newly assigned to the transmitting sequence used by the transmitting nodes of which connection has been disconnected by the disconnecting device, the information being received as an answer for the optimization request from the transmitting node, and a connecting device that establishes a new connection between the newly assigned transmission plug and the reception plug of the receiving node of which connection has been disconnected by the disconnecting device.

5 Claims, 10 Drawing Sheets

U.S. PATENT DOCUMENTS

| | | | |
|---|---|---|---|
| 7,145,872 B1 * | 12/2006 | Kim | 370/230 |
| 7,227,846 B2 | 6/2007 | Ono et al. | |
| 2001/0021188 A1 | 9/2001 | Fujimori et al. | |
| 2002/0016882 A1 | 2/2002 | Matsuuchi et al. | |
| 2005/0220140 A1 | 10/2005 | Abe et al. | |

OTHER PUBLICATIONS

Moses, Bob and Bartlett, Greg; Audio Distribution and Control Using the IEEE 1394 Serial Bus., PAVO, Inc., Seattle, Washington, USS, AES Journal [online], Aug. 1997, pp. 1-27.

Yamaha Corporation: Audio and Musical Protocol Draft Version 0.32, Aug. 1, 1996, pp. 1-49.

SC 29 Secretariat: IEC CDV 61883-6: Consumer Audio/Video Equipment—Digital Inteface-Part 6, Audio and Music Data Transmissin, Sep. 30, 2003.

Foss, et al.: AV/C Digital Interface Command Set General Specification 4.1 Trade Association—TA Document, Dec. v. 11, 2001, pp. 1-108.

Consumer Audio/Video Equipment—Digital Interface—Part 6: Audio and Music Data Transmission Protocol, International Electro Technical Commission, Jul. 2002.

* cited by examiner

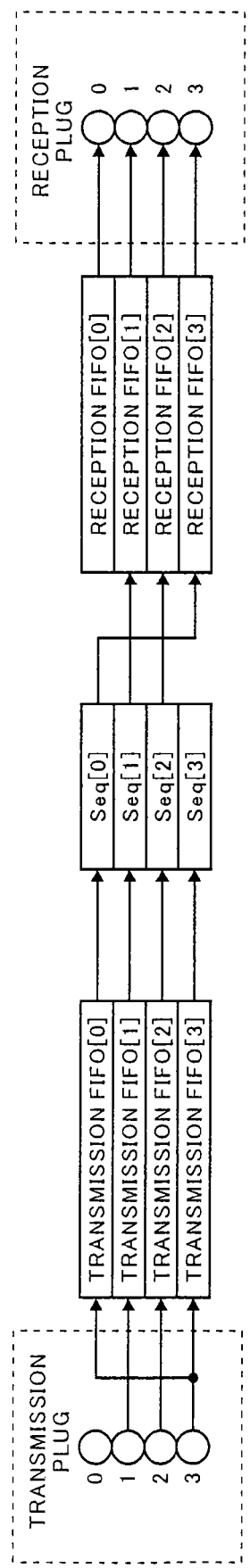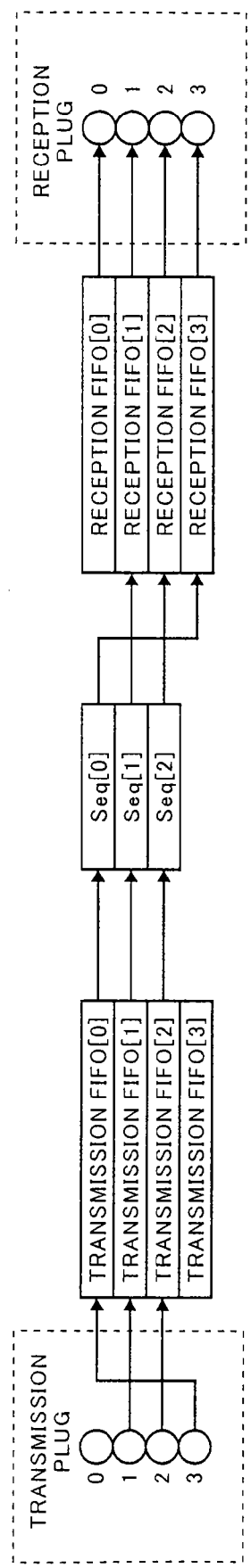
FIG. 3D
FIG. 3E

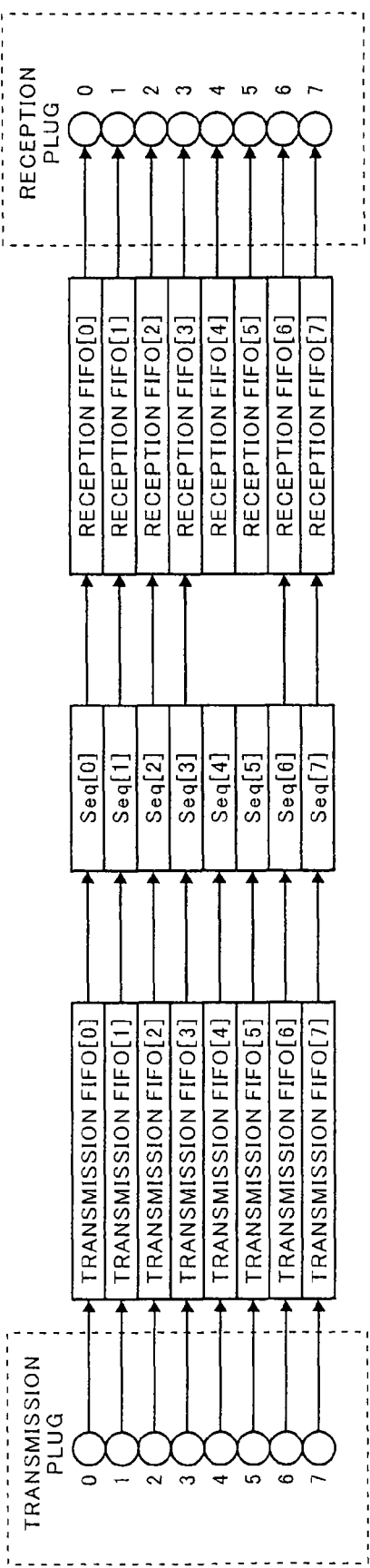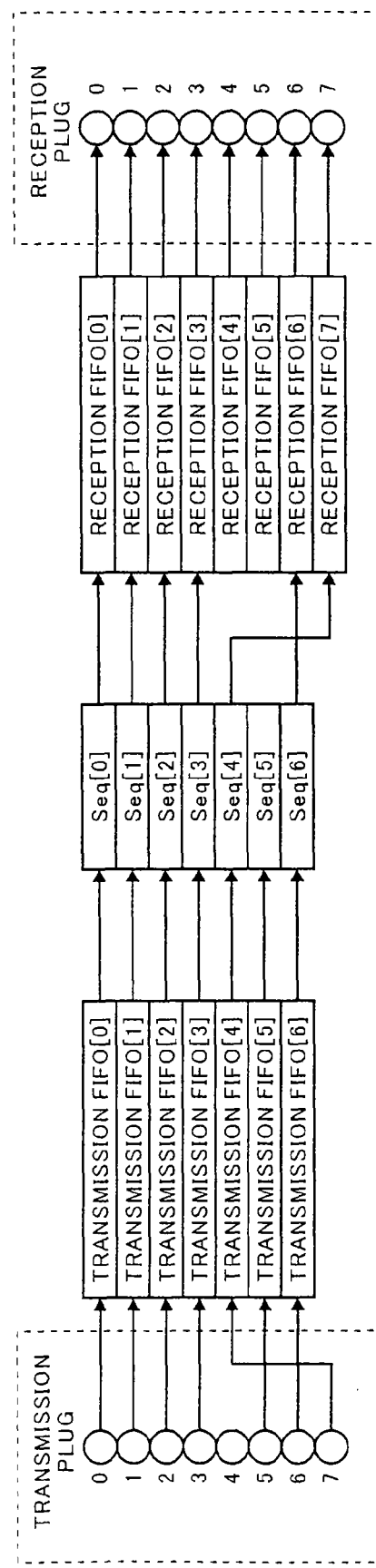

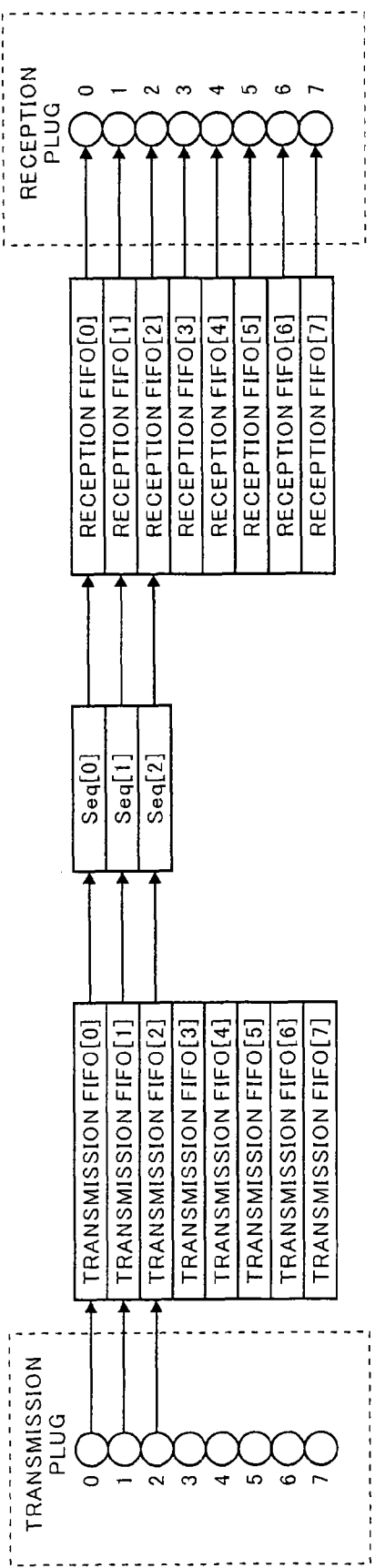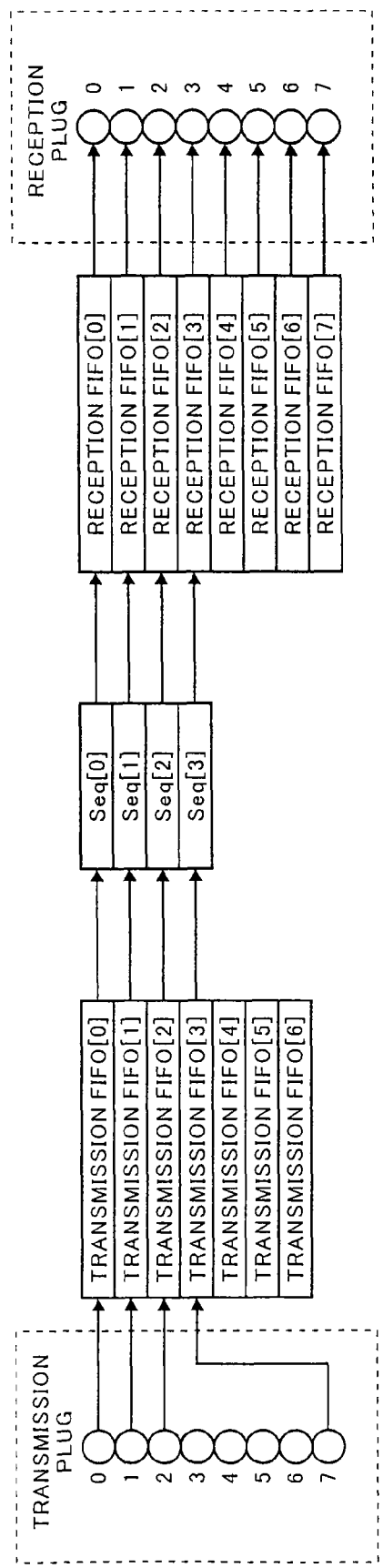

DATA TRANSMISSION APPARATUS EFFICIENTLY USING NETWORK RESOURCES

CROSS REFERENCE TO RELATED APPLICATION

This application a division of U.S. patent application Ser. No. 11/077,667 filed Mar. 11, 2005, the entire contents of which are incorporated herein by reference.

BACKGROUND OF THE INVENTION

A) Field of the Invention

This invention relates to a data transmission apparatus and more in detail, is related to a data transmission apparatus to be connected to communication network being capable of isochronous transmission such as an IEEE1394 network, etc.

B) Description of the Related Art

The IEEE1394 is well known for a standard of a serial bus interface. In the communication network based on the IEEE1394 Standards (hereinafter, called the IEEE1394 network), Maximum sixty-three apparatuses (hereinafter, called the IEEE1394 device) can be connected to one bus (a local bus).

Generally, by controlling a parameter relating to a bus configuration, a controller that optimizes usage efficiency of the local bus 0@and other nodes are connected to one bus. As the other nodes, for example, there are a talker (a transmission node) and a listener (a reception node). The talker transmits a fixed amount of data (for example, audio stream for 8 channels and MIDI stream for 1 cable) determined in advance of an audio device such as an electronic musical instrument that can output an audio (voice) signal and a MIDI device that outputs a MIDI signal to the bus by one isochronous stream (one isochronous packet transmission in every isochronous cycle). For example, refer to "consumer audio/video equipment—Digital interface—Part 6: Audio and music data transmission protocol", International Electro technical Commission, Jul. 12, 2002.

FIG. 9 is a schematic view representing a technique for establishing a connection between the transmission plug and the reception plug in the conventional IEEE 1394 devices.

In the talker that is a transmission node, 8 transmission plugs [0-7] are set, and 8 transmission FIFO are set to be agreed with the number of the transmission plugs. Paths between the transmission FIFO [0-7] and the corresponding transmission plugs [0-7] are fixed and cannot be changed.

As same as the transmission node, in the listener that is a reception node, 8 reception plugs [0-7] are set, and 8 reception FIFOs are set in correspondence with the number of the reception plugs. Paths between the reception FIFOs [0-7] corresponding to the reception plugs [0-7] are fixed and cannot be changed.

In the conventional IEEE1394 device, the number of sequences of the data stream transmitted from the transmission node is fixed, and number of the sequences cannot be increased or decreased dynamically. In an example shown in FIG. 9, when the number of the sequences transmitted from the transmission node is 8, i.e., the sequences Seq [0-7], it is necessary to reserve bandwidth corresponding to the 8 sequences on the IEEE1394.

For example, as shown in FIG. 9, when a connection is established between the transmission plugs [4] and [5] and the reception plugs [0] and [1], the number of the sequences cannot be increased or decreased dynamically. Therefore, the transmission node needs to transmit all the 8 sequences.

That is, in the conventional IEEE 1394 device, by continuously transmitting data stream without a receiver, the bandwidth is wastefully occupied. For example, when there are the receivers only in channel 7 and channel 8 of the audio 8 channels that are transmitted from the transmitter, channel 1 to channel 6 without receivers spends a wasteful bandwidth. Moreover, in a network equipped with the isochronous transmission function other then the IEEE1394 network, the number of the sequences transmitted by isochronous transmission cannot be changed dynamically as same as in the IEEE1394 network.

SUMMARY OF THE INVENTION

It is an object of the present invention to provide a data transmission apparatus that can efficiently use resources on a bus capable of isochronous transmission.

According to one aspect of the present invention, there is provided a data transmission apparatus connecting to a network capable of isochronous transmission consisted of a plurality of data transmission apparatuses, the data transmission apparatus comprising: a disconnecting device that disconnects a connection established between a transmission plug of a transmitting node and a reception plug of a receiving node, both nodes being connected to the network capable of isochronous transmission; an optimization requesting device that requests optimization of transmitting sequences to the transmitting node; a receiver that receives information about a transmission plug newly assigned to the transmitting sequence used by the transmitting nodes of which connection has been disconnected by the disconnecting device, the information being received as an answer for the optimization request from the transmitting node; and a connecting device that establishes a new connection between the newly assigned transmission plug and the reception plug of the receiving node of which connection has been disconnected by the disconnecting device.

According to another aspect of the present invention, there is provided a data transmission apparatus connecting to a network capable of isochronous transmission consisted of a plurality of data transmission apparatuses, the data transmission apparatus comprising: a receiver that receives a request for optimization of transmitting sequences from a control node connected to the network capable of isochronous transmission; a duplicator that duplicates, in accordance with the request for optimization, data transmitted by a transmission plug assigned to a first transmission sequence that is a last sequence of a data stream; a transmitter that transmits the duplicated data duplicately by using a second transmission sequence of which connection has not been established with a reception plug of a receiving node connected to the network capable of isochronous transmission; a terminator that terminates transmission of the data from of the first transmission sequence; and a releasing device that releases bandwidth used by the first sequence on an bus capable of isochronous transmission.

According to the present invention, by increasing number of the transmission sequences dynamically corresponding to number of the set connections, only necessary bandwidth can be used, and resources on the bus capable of isochronous transmission can be used efficiently.

Also, according to the present invention, by decreasing number of the transmission sequences dynamically corresponding to number of the set connections, only necessary bandwidth can be used, and resources on the bus capable of isochronous transmission can be used efficiently.

Moreover, according to the present invention, by combining the decreasing process and the increasing process of the sequences, bandwidth for the number of the sequences corresponding to the number of the transmission plug which the connection is actually established between the reception plug can be reserved, and bandwidth for wasteful sequences can be lost, and the resources on the bus capable of isochronous transmission can be used efficiently.

BRIEF DESCRIPTION OF THE DRAWINGS

FIG. 7 is a schematic view for explaining the second example of a sequence increasing process according to the embodiment of the present invention.

DETAILED DESCRIPTION OF THE PREFERRED EMBODIMENTS

Figure 1:
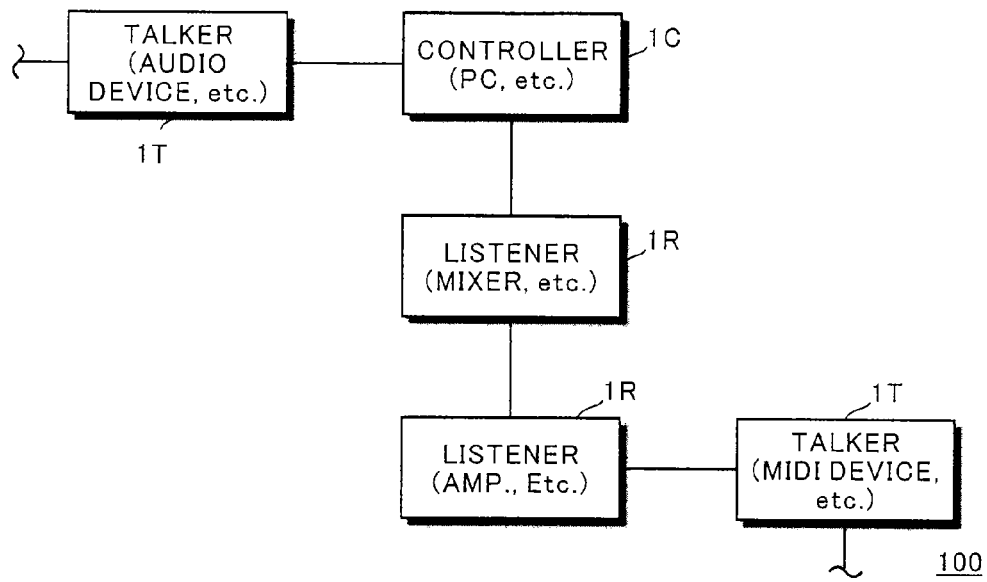
FIG. 1 is a diagram showing a bus structure of a network 100 according to an embodiment of the present invention.

FIG. 1 is a diagram showing a bus structure of a network 100 according to an embodiment of the present invention.

The network 100 is consisted of, for example, a controller 1C, a talker 1T and a listener 1R connected with each another with a communication cable. The network 100 may be any type of a network having an isochronous transmission function. For example, as the network having an isochronous transmission function, there are an IEEE1394 network, a network using a universal serial bus (USB), Cobra Net™, etc.

In this specification, the "isochronous transmission" is a method for transmitting data wherein transmission data capacity (bandwidth) for a specific time period is reserved and guaranteed by transmitting an isochronous packet to a bus with priority in a specific isochronous cycle. For example, it may be applied that a method wherein transmission data capacity (bandwidth) for a specific time period (1 frame) is reserved and guaranteed by interrupting in a bus for suspending other transmissions in a specific isochronous cycle and by transmitting an isochronous packet to a bus with priority in a specific isochronous cycle, even though other devices are using a network or the bus and traffic of the communication of the other devices is high. Although the isochronous transmission method insures transmission data capacity (bandwidth) for a specific time period, data itself transmitted is not guaranteed; therefore, the data will be dumped when an error occurs.

The controller (controlling node) 1C is consisted of, for example, a personal computer and the like, and can control parameters relating to a bus structure.

The talker 1T is a transmission node to transmit, for example, a fixed amount of data (for example, audio stream for 8 channels and MIDI stream for 1 cable) that is decided in advance with 1 isochronous stream to the bus. The talker 1T is, for example, an audio device like an electronic musical instrument that can output an audio (sound) signal and a MIDI device that outputs a MIDI signal. The listener 1R is a reception node to receive the isochronous stream transmitted by the above-described talker 1T.

In this specification, the "stream" represents "data flow", and in a communication network, it represents reproducing data such as motion pictures, music, etc while receiving the data simultaneously. By that, the data can be reproduced without waiting for all the data to be received, and the same periodicity (being isochronous) can be maintained.

Moreover, in the network capable of the isochronous transmission according to the embodiment of the present invention, one isochronous packet includes data for a plurality of sequences, and each device on the network can transmits a plurality of sequences by transmitting one isochronous packet in a isochronous cycle.

In this specification, the "sequence" is a unit of data flow in which bandwidth is guaranteed. When audio stream or MIDI stream is transmitted, the audio stream or the MIDI stream is included in one of the sequences. A sequence number is added to each of the plurality of sequences included in one isochronous stream for specifying each sequence.

Hereinafter, a network based on the IEEE1394 Standards (an IEEE1394 network) will be explained as an example of the network capable of the isochronous transmission with reference to the drawings.

Figure 2:
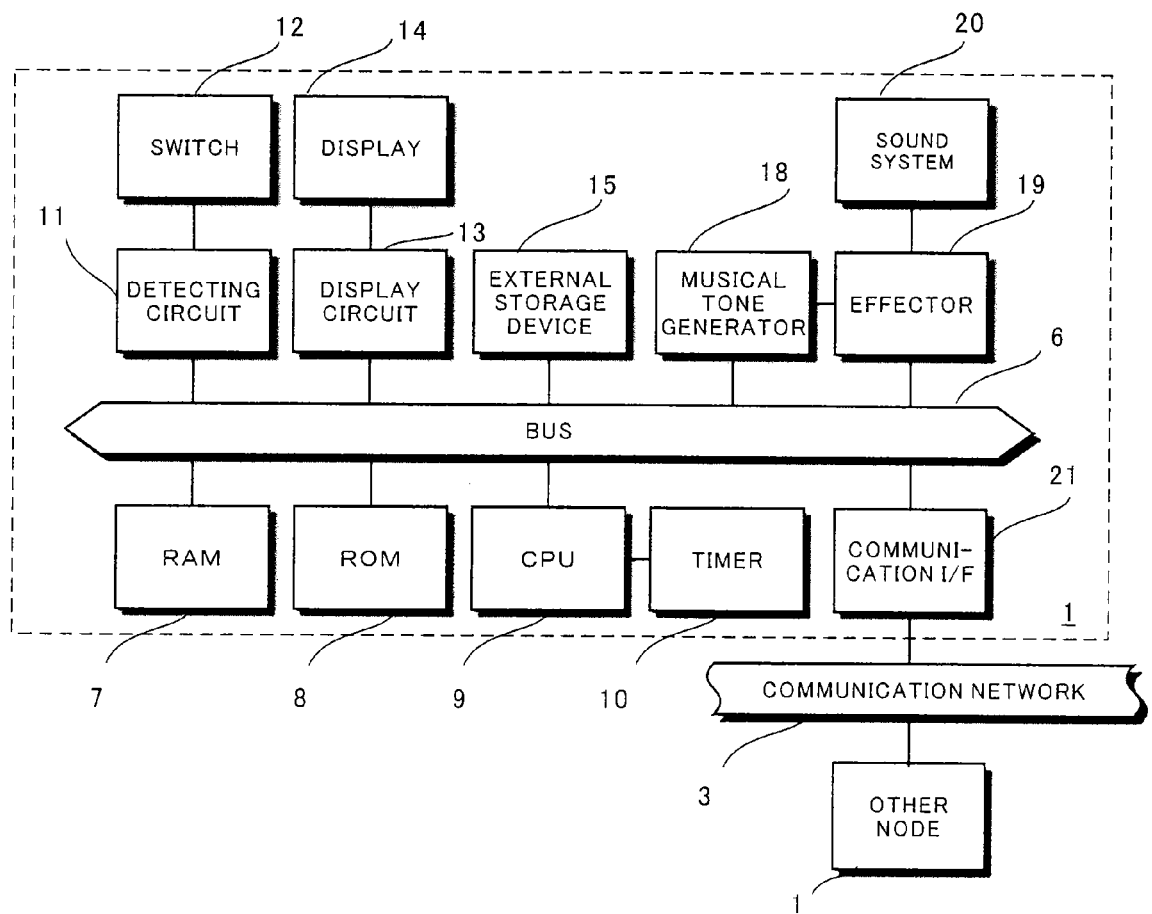
FIG. 2 is a block diagram showing a hardware structure of a communication node 1 (a controller 1C, a talker 1T and a listener 1R) according to the embodiment of the present invention.

FIG. 2 is a block diagram showing a hardware structure of a communication node 1 (a controller 1C, a talker 1T or a listener 1R) according to the embodiment of the present invention.

A RAM 7, ROM 8, a CPU 9 and an external storage device 15, a detecting circuit 11, a display circuit 13, a musical tone generator 18, an effector 19 and a communication interface 21 are connected to a bus 6 in a data transmission apparatus 1.

A user can perform various settings by using a switch 12 connected to the detector circuit 11. The switch may be, for example, a mouse, an alphanumerical keyboard, a joy-stick, a rotary encoder, a switch, a jog-shuttle and the like, and may be anything that can output a signal corresponding to the user's input operation.

Also, the switch 12 may be a soft switch displayed on a display 14 to be operated by using other switch such as a mouse.

The display circuit 13 is connected to the display 14, and can display various kinds of information on the display 14.

The external storage device 15 includes an interface for the external storage device, and is connected to the bus 6 via the interface. The external storage device 15 is, for example, a Floppy™ disk drive (FDD), a hard disk drive (HDD), a magneto optical (MO) drive, a CD-ROM (a compact disc read only memory) drive, a DVD (a digital versatile disc) drive, a semiconductor memory and the like.

Various parameters, data including automatic performance data and programs for realizing the embodiment of the present invention can be stored in the external storage device 15.

The RAM 7 has a working area of the CPU 5 and stores a flag, a register or a buffer, and various parameters. The various parameters, a controlling program and the programs for realizing the embodiment of the present invention can be stored in the ROM 8. The CPU executes calculation or control in accordance with the control program stored in the ROM 8 or the external storage device 15.

A timer 10 is connected to the CPU 9 and supplies a standard clock signal and interrupts timing to the CPU 9.

The musical tone generator 18 generates a musical tone signal corresponding to audio data and a performance signal such as the MIDI signal and supplies the musical tone signal to a sound system 20 via the effector circuit 19.

The effector circuit 19 adds various effects on the musical tone signal in a digital format provided from the musical tone generator 18. The sound system 20 includes a D/A converter and a loudspeaker and converts the provided digital musical tone signal to analogue format to pronounce.

The communication interface 21 is an interface based on the IEEE 1394 Standards. Also, as the communication interface 21, interface that can be connected to a communication network 3 such as the LAN (local area network), the Internet and telephone circuit may be equipped. In that case, the communication interface 21 is connected to a server computer via the communication network 3, and a control program and programs for realizing the embodiment of the present invention can be downloaded in the external storage device such as the HDD or the RAM 7 and the like.

Moreover, as the communication interface 21, a MIDI interface that can be connected to the MIDI device and a USB interface that can be connected to a USB device may be equipped.

Moreover, when the communication node 1 is used as the talker 1T or the listener 1R, it is considered that the communication node 1 is an audio device such as an amplifier, a loudspeaker (powered-speaker), an audio mixer and an electronic musical instrument. In that case, it may be necessary to be equipped with only necessary parts for executing necessary functions for each device. For example, the I@display circuit 13 and the display 14 may be omitted.

FIG. 3 is a schematic view for explaining the first example of a sequence decreasing process of the embodiment of the present invention.

Figure 3A:
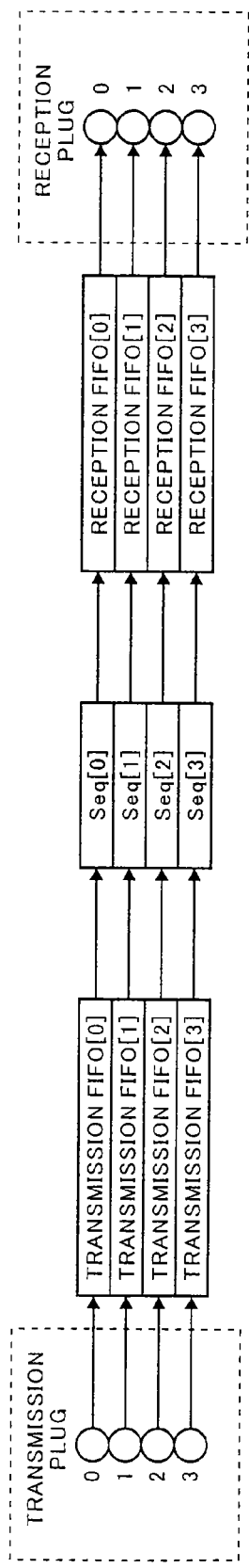
FIG. 3 is a schematic view for explaining the first example of a sequence decreasing process of the embodiment of the present invention.

FIG. 3A is a schematic view showing an initial state of the sequence assignment before executing the sequence decreasing process according to the embodiment of the present invention. In the initial state, connections have been established between the same numbered plugs, that is, between the transmission plugs (Tx0 to 3) and the reception plugs (Rx0 to 3) respectively. The number of the sequences at this time is "4". That is, the talker 1T reserves bandwidth for 4 sequences on the IEEE 1394 bus.

Figure 3B:
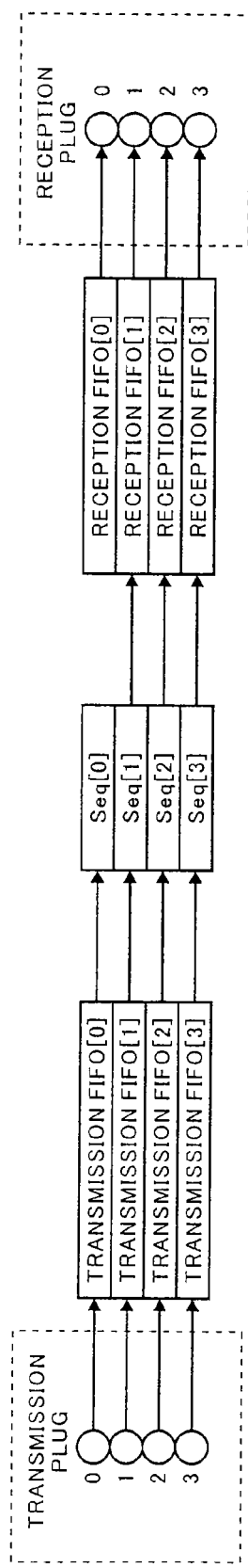

In this condition, when the connection from the transmission plug "Tx0" to the reception plug [Rx0] is disconnected, it becomes a state shown in FIG. 3B. That is, the transmission plug [Tx0] is still transmitting the data stream via the transmission FIFO [0] by using bandwidth for the sequence Seq [0] whereas the reception plug is receiving nothing. Since the number of sequences cannot be decreased dynamically in the conventional apparatus, the bandwidth on the IEEE1394 bus remains the same as the initial state shown in FIG. 3A although the connection is terminated. It will cause that the bandwidth for one sequence will be useless.

Figure 3C:
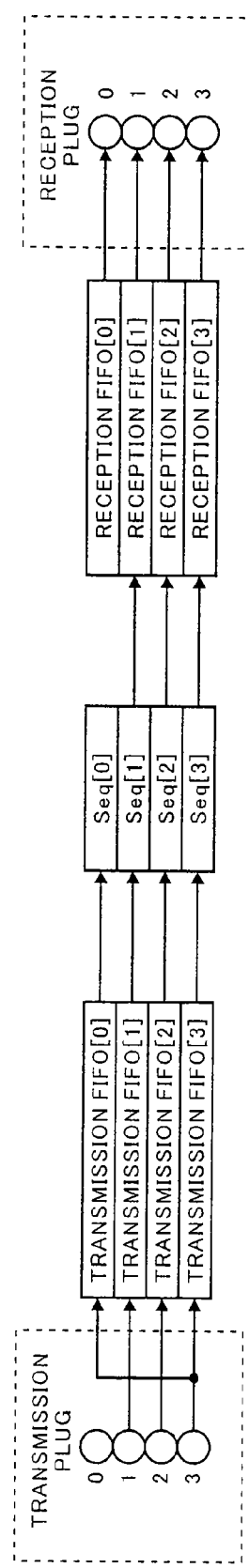

Therefore, in the embodiment of the present invention, after terminating the connection, the sequences will be optimized. First, as shown in FIG. 3C, the data of the transmission plug [Tx3] that is assigned to that last sequence Seq [3] is duplicated and transmitted by using the sequence Seq [0] via the transmission FIFO [0]. At that time, the data of the transmission plug [Tx3] is transmitted to the bus by using the sequence Seq [0] and Seq [3] duplicately.

Next, as shown in FIG. 3D, the sequence that the reception plug [Rx3] receives is changed from the sequence Seq [3] to the sequence Seq [0]. As described in the above, by changing the sequence that the reception plug [rx3] receives while the data of the transmission plug [Tx3] is being transmitted duplicately by the sequence Seq [0] and Seq [3], the data can be transmitted and received without interruption.

Finally, as shown in FIG. 3E, the data transmission via the transmission FIFO [3] is stopped, and the sequence Seq [3] is deleted, and the number of the sequence is decreased from 4 to 3. After that, by releasing the bandwidth that the sequence Seq [3] had reserved, an available bandwidth on the IEEE1394 will be increased.

As described in the above, upon the termination of the connection, the sequence in use is dynamically decreased from the sequences Seq [0] to Seq [3] to the sequences Seq [0] to Seq [2] with keeping the connections for the sequences Seq [1] and Seq [2] corresponding to the termination so that the bandwidth corresponding to the decreased sequence can be released. Therefore, resource on the IEEE1394 bus can be efficiently used.

FIG. 4 is a schematic view for explaining the second example of a sequence decreasing process of the embodiment of the present invention. In this example, a case that the data receptions of the 2 reception plugs are terminated will be explained. In the initial state, connections have been established between the same numbered plugs, that is, between the transmission plugs (Tx0 to 7) and the reception plugs (Rx0 to 7) respectively. The number of the sequences at this time is "8". That is, the talker 1T reserves bandwidth for 8 sequences on the IEEE 1394 bus. Here, as shown in FIG. 4A, the connection from the transmission plug [Tx4] to the reception plug [Rx4] and the connection from the transmission plug [Tx5] to the reception plug [Rx5] will be disconnected.

First, the data of the transmission plug [Tx7] that is assigned to the last sequence is copied, and the copied data will be transmitted to the bus by using the sequence Seq [4] via the transmission FIFO [4] duplicately with the sequence Seq [7] via the transmission FIFO [7]. Then, the sequence that the reception plug [Rx7] receives the data is changed from the sequence Seq [7] to Seq [4]. Next, the data transmission via the transmission FIFO [7] is terminated, and sequence Seq [7] will be deleted; therefore, the number of the sequences is decreased from 8 to 7. Then, the bandwidth that the sequence Seq [7] has been reserved will be released. At that time, a condition of the bandwidth becomes the condition shown in FIG. 4B, and total number of the sequences is 7 at this time.

Next, the data of the transmission plug [Tx6] that is assigned to the last sequence in the state shown in FIG. 4B is duplicated, and the duplicated data is transmitted to the bus by using the sequence Seq [5] via the transmission FIFO [5] duplicately with the sequence Seq [6] via the transmission FIFO [6]. Then, the sequence that the reception plug [Rx6] receives the data is changed from the sequence Seq [6] to Seq [5]. Next, the data transmission via the transmission FIFO [6] is terminated, and sequence Seq [6] will be deleted; therefore, the number of the sequences is decreased from 7 to 6. Then, the bandwidth that the sequence Seq [6] has been reserved will be released.

Figure 4C:
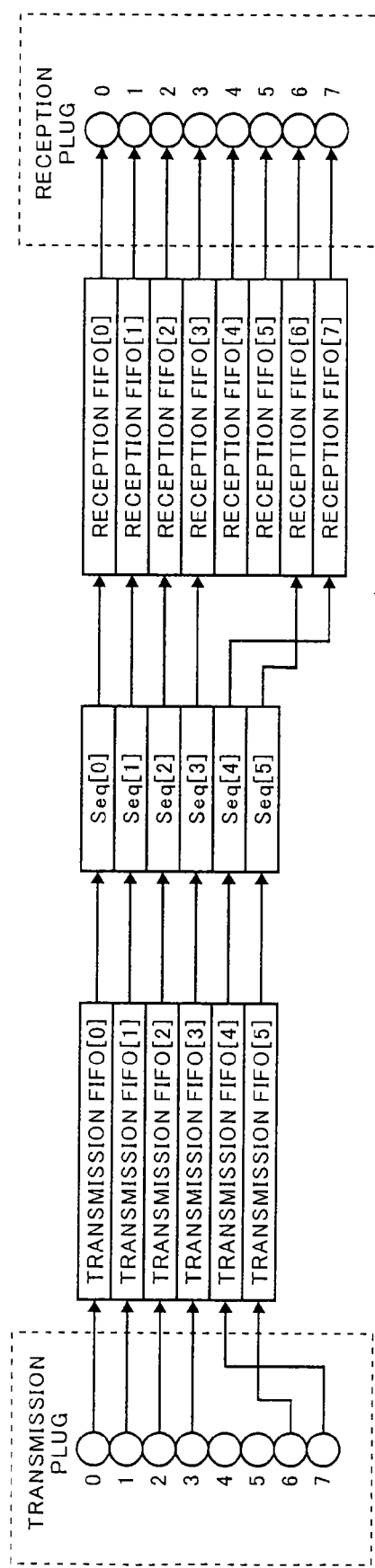
FIG. 4 is a schematic view for explaining the second example of a sequence decreasing process of the embodiment of the present invention.

By the processes described in the above, the bandwidth becomes a condition shown in FIG. 4C. By releasing the bandwidth for two sequences that the sequences Seq [6] and Seq [7] had used, the resources on the IEEE1394 can be used efficiently.

Figure 5:
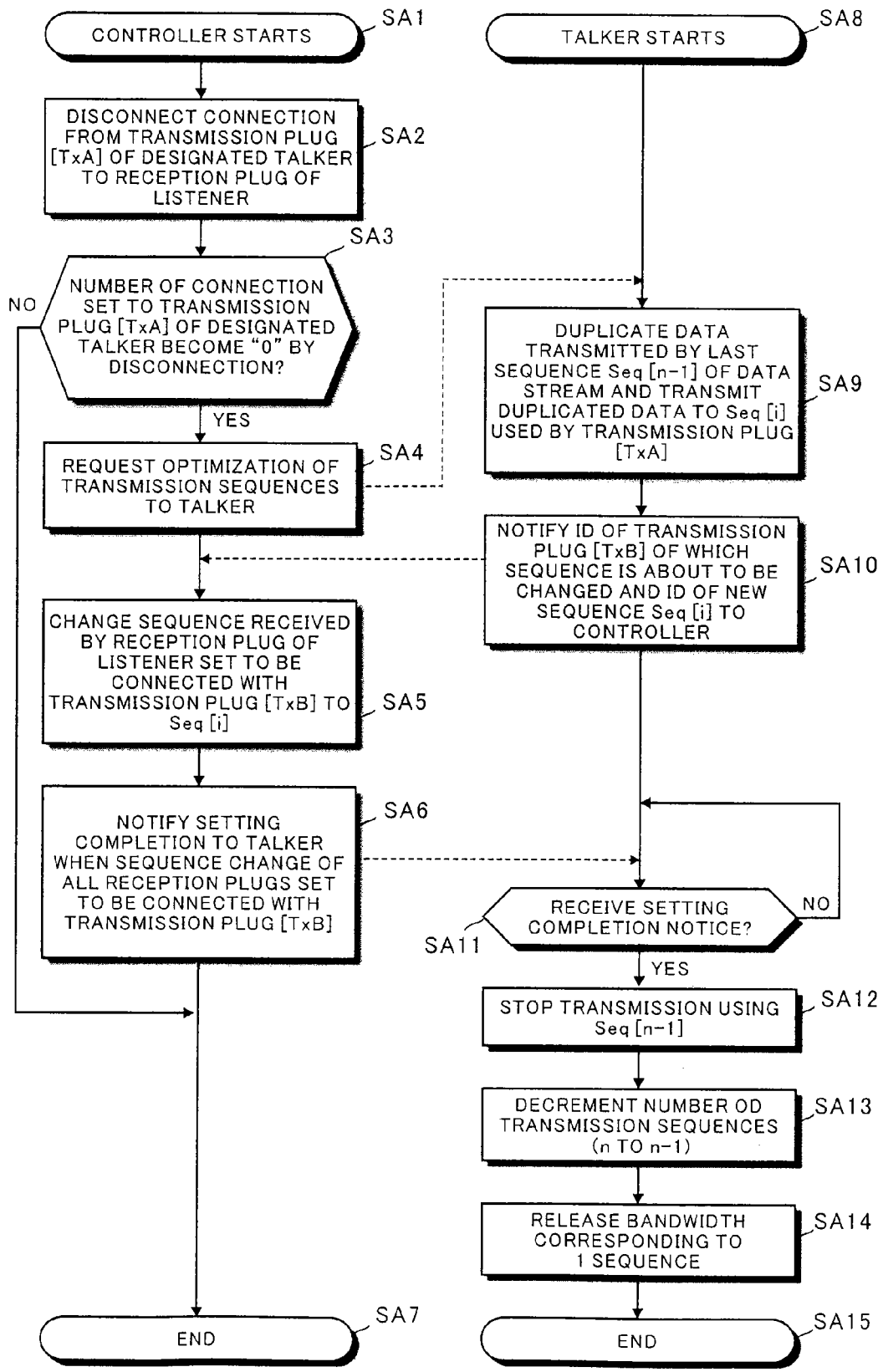
FIG. 5 is flow chart representing the sequence decreasing process according to the embodiment of the present invention.

FIG. 5 is flow chart representing the sequence decreasing process according to the embodiment of the present invention. In the drawing, a dotted arrow indicates a command flow. This sequence decreasing process starts when disconnection from a transmission plug [TxA] of a designated talker 1T to a reception plug of a listener 1R is instructed.

At Step SA1, a process on the controller 1C is started, and the connection from the transmission plug [TxA] of the designated talker 1T to the reception plug of the listener 1R is disconnected at Step SA2.

At Step SA3, it is judged whether the number of the connections (the number of the reception plugs [Rx] that receives the isochronous stream transmitted from the transmission plug [TxA]) set in the transmission plug [TxA] of the designated talker 1T becomes 0 or not by the disconnection process at Step SA2. When the number of the connection becomes 0, that is, when the reception plug [Rx] that receives the isochronous stream transmitted from the transmission plug [TxA] becomes 0, the process proceeds to Step SA4 as indicated with an arrow "YES". When the number of the connection is not 0, that is, when there is a reception plug set the connection with the transmission plug [TxA] other than the reception plug disconnected at Step SA2, the process proceeds to Step SA7 as indicated with an arrow "NO" to finish the process on the controller 1C. Moreover, when the process finishes following the arrow "NO", the process on the talker 1T is not executed.

At Step SA4, an optimization of the transmission sequence is requested to the designated talker 1T After that, when an identifier (ID) of a transmission plug [TxB] of which the sequence to be changed and an identifier (ID) of a new sequence Seq [i] transmitted from the talker 1T at later-described Step SA10 are received, the sequence from which the reception plug of the listener 1R that is set to be connected with the transmission plug [TxB] will be changed to Seq [i] at Step SA5.

At Step SA6, it is judged whether the sequence change for all the reception plugs with which the transmission plug [TxB] is connected is finished or not. When the confirmation is finished, setting completion will be informed to the talker 1T. After that, the process proceeds to Step SA7 to finish the process on the controller 1C.

At Step SA8, a process on the talker 1T is started. Then, after the optimization request of the transmission sequence transmitted from the controller 1C at Step SA3 is received, the data of the transmission plug [TxB] transmitting with the last sequence Seq [n−1] (n is a total number of the sequences at that time) of the data stream is duplicated to be transmitted to the sequence [i] that had been used by the transmission plug [TxA] of which connection with the reception plug of the listener 1R was disconnected at Step SA2.

At Step SA10, the ID of the transmission plug [TxB] of which the sequence is to be changed and the ID of the new sequence Seq [i] is notified to the controller 1C.

At Step SA11, it is judged whether the setting termination notice transmitted from the controller 1C at Step SA6 is received or not. When the setting termination notice has been received, the process proceeds to Step SA12 as indicated with an arrow "YES". When the setting termination notice has not been received, Step SA11 is repeated as indicated with an arrow "NO" to wait the reception of the setting termination notice.

At Step SA 12, the data transmission of the sequence Seq [n−1] that the transmission plug [TxB] has been transmitting the data from the beginning is terminated. After that, the number of the transmission sequences is decreased from n to n−1 at Step SA13.

At Step SA14, bandwidth for 1 sequence decreased at Step SA13 is released. After that, the process proceeds to Step SA15 to finish the process on the talker 1T.

FIG. 6 is a schematic view for explaining the first example of a sequence increasing process according to the embodiment of the present invention. In this example, a case of increasing number of sequences again after executing the first example of the sequence decreasing process shown in FIG. 3 will be explained.

Figure 6A:
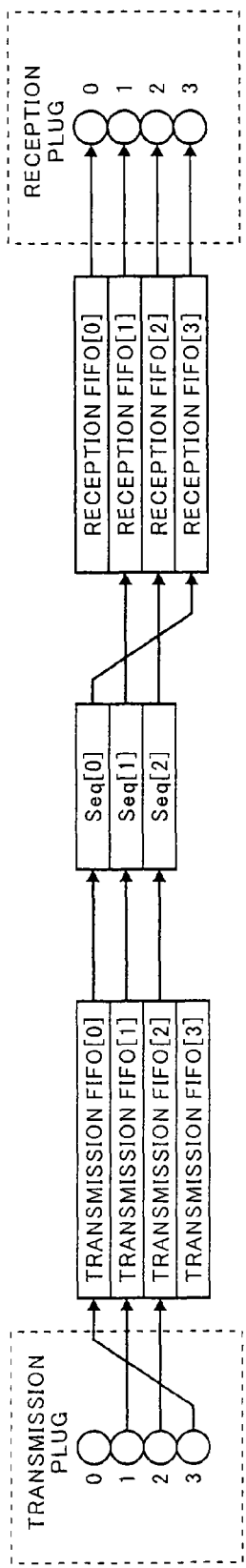
FIG. 6 is a schematic view for explaining the first example of a sequence increasing process according to the embodiment of the present invention.
Figure 6B:
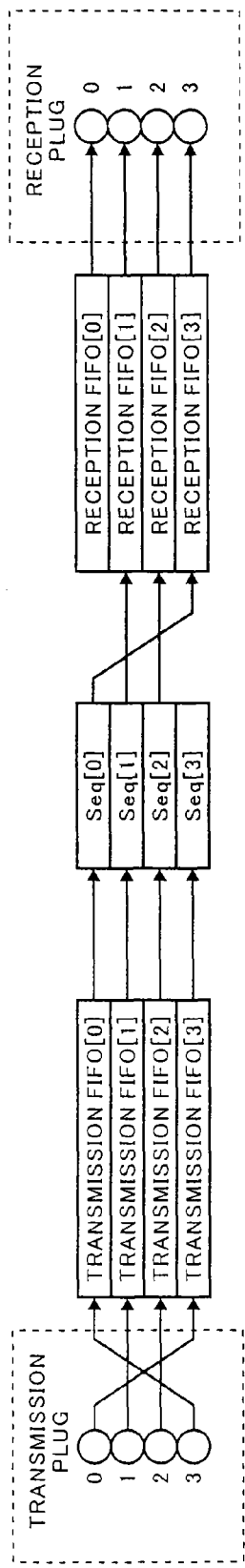

FIG. 6A is a schematic view showing an initial state of the sequence assignment before the sequence increasing process according to the embodiment of the present invention. In the initial state, connections are set between the transmission plug [Tx1] and the reception plug [Rx1], and the transmission plug [Tx2] and the reception plug [Rx2] by respectively using the sequence Seq [1] and the sequence Seq [2]. Moreover, connection is set via the sequence Seq [0] between the transmission plug [Tx3] and the reception plug [Rx3]. The number of sequences at this time is "3". That is, the talker 1T reserves bandwidth for 3 sequences on the IEEE1394 bus.

Here, when a connection from the transmission plug [Tx0] to the reception plug [Rx0] is set, a sequence Seq [3] is added to the last of the sequences, and the transmission plug [0] is assigned to the increased sequence Seq [3]. Then, the data of the transmission plug [0] is transmitted via the transmission FIFO [3] and the condition becomes that shown in FIG. 6B.

Figure 6C:
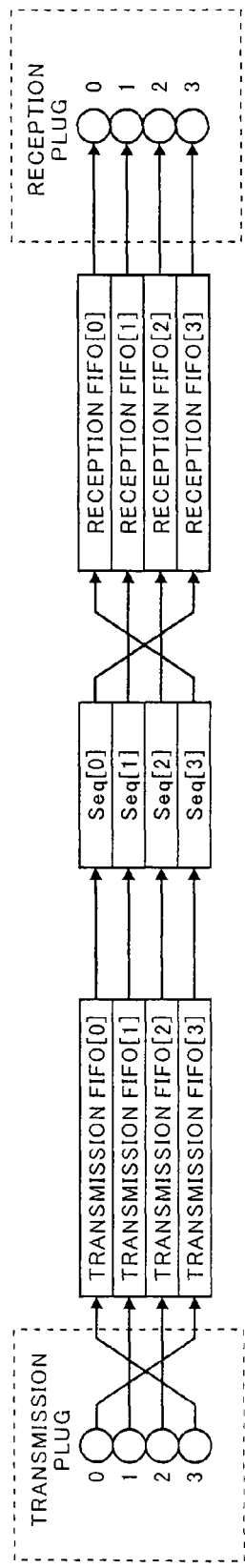

After that, as shown in FIG. 6C, the sequence from which the reception plug [Rx0] receives is set to the sequence Seq [3]. As described in the above, by increasing a necessary sequences corresponding to the connection setting when the connection is set, a wasteful sequence can be omitted, and the resources on the IEEE1394 bus can be used efficiently.

FIG. 7 is a schematic view for explaining the second example of a sequence increasing process according to the embodiment of the present invention.

FIG. 7A is a schematic view showing an initial state of the sequence assignment before the sequence increasing process according to the embodiment of the present invention. In the initial state, a connection is set between the transmission plugs [Tx0] to [Tx2] and the reception plugs [Rx0] to [Rx2] by respectively using the sequences Seq [0] to Seq [2].

Here, when a connection from the transmission plug [Tx7] to the reception plug [Rx3] is set, a sequence Seq [3] is added to the last of the sequences, and the transmission plug [Tx7] is assigned to the increased sequence Seq [3]. Then, the data of the transmission plug [Tx7] is transmitted via the transmission FIFO [3], and the condition becomes that shown in FIG. 7B.

Figure 8:
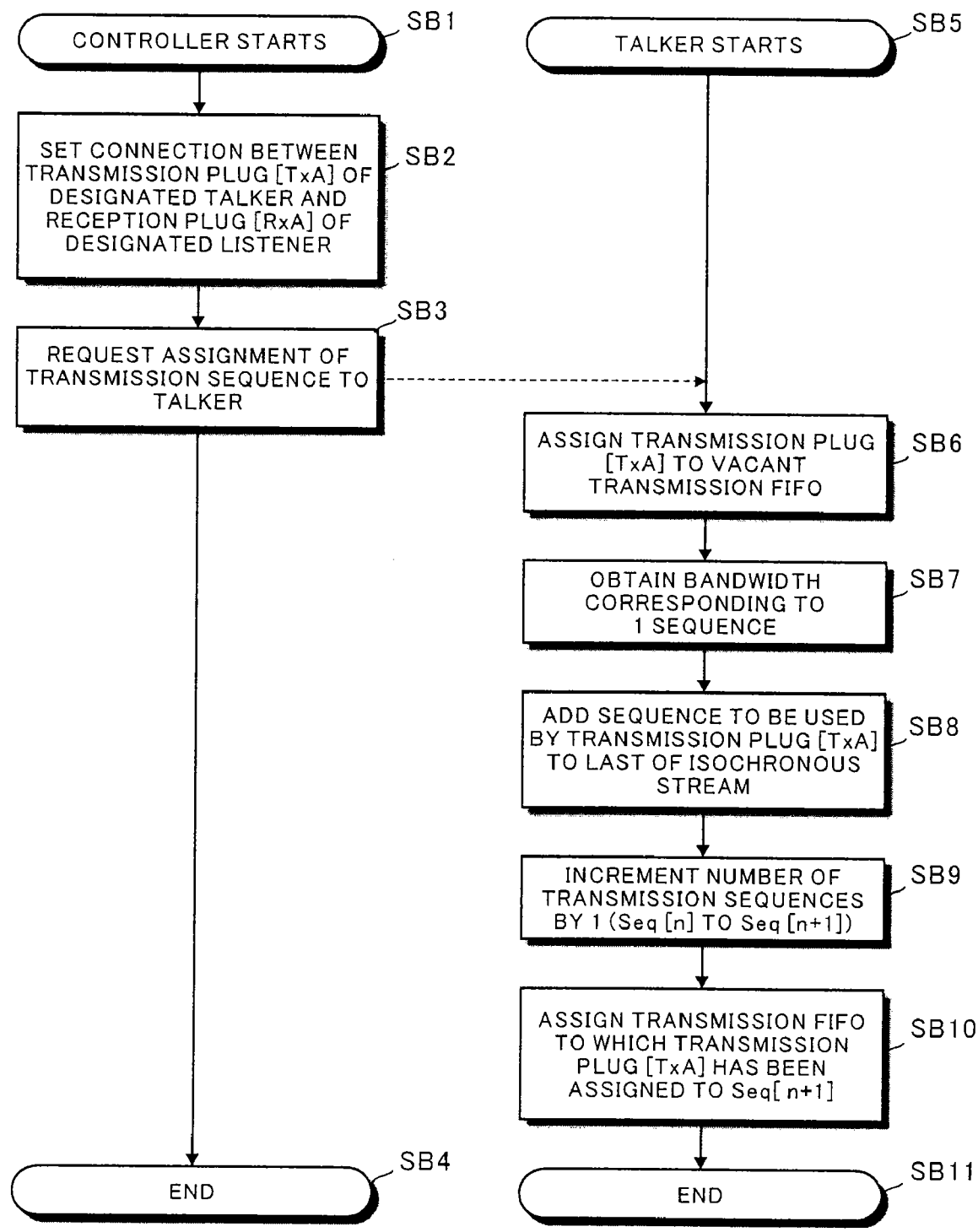
FIG. 8 is a flow chart representing the sequence increasing process according to the embodiment of the present invention.
Figure 9:
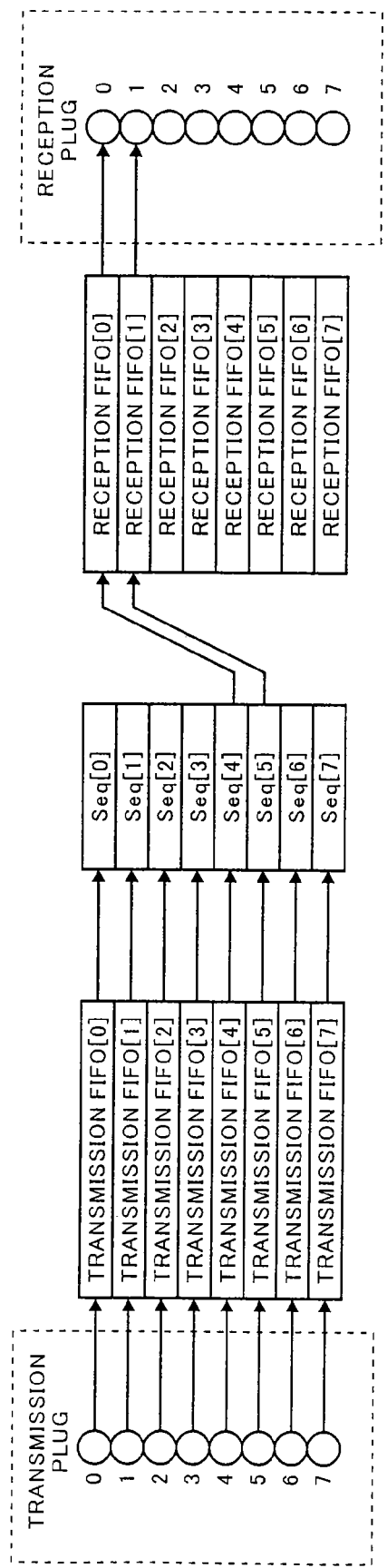
FIG. 9 is a schematic view representing a technique for establishing a connection between the transmission plug and the reception plug in the conventional IEEE 1394 devices.

FIG. 8 is flow chart representing the sequence increasing process according to the embodiment of the present invention. In the drawing, a dotted arrow indicates a command flow. This sequence increasing process starts when setting of a connection from the transmission plug [TxA] of the designated talker 1T to the reception plug of the listener 1R is directed.

At Step SB5, a process on the controller 1C is started. At Step SB2, a connection is set between the transmission plug [TxA] of the designated talker 1T and the reception plug [RxA] of the designated listener. After that, at Step SB3, execution of the assignment of the sequence to the transmission plug [TxA] is requested to the talker 1T, and the process proceeds to Step SB4 to finish the process on the controller 1C.

At Step SB5, a process on the talker 1T is started. When the assignment request transmitted from the controller 1C at Step SA3 is received, the transmission plug [TxA] is assigned to a vacant transmission FIFO at Step SB6.

At Step SB7, bandwidth for 1 sequence is reserved on the IEEE1394 bus. After that, at Step SB8, the sequence (data) handled by the transmission plug [TxA] is added at the last of the isochronous stream.

At Step SB9, the number of the sequences transmitted by the talker 1T is incremented by 1 (Seq [n] to Seq [n+1]). Then, at Step SA10, the transmission FIFO assigned to the transmission plug [TxA] is further assigned to the sequence Seq [n+1], and the process proceeds to Step SB11 to finish the process on the talker 1T.

As described before, according to the embodiments of the present invention, the route of the transmission plug and the transmission FIFO can dynamically changed. Moreover, the number of the transmission sequences can be changed dynamically.

That is, according to the embodiments of the present invention, when a connection is disconnected, the number of the sequences will be decremented corresponding to the disconnection. Then, by releasing the bandwidth for the decremented sequence on the IEEE1394 bus, the resources on the IEEE1394 bus can be used efficiently.

Moreover, according to the embodiments of the present invention, when connection is set, by incrementing number of sequences just in need corresponding to a connection setting, a wasteful sequence can be omitted, and resources on the IEEE1394 bus can be used efficiently.

Moreover, according to the embodiments of the present invention, by combining the decreasing process and the increasing process of the sequences, only bandwidth for number of the sequences agreed with number of the transmission plugs set to be connected with the reception plugs can be reserved on the IEEE1394 bus. Therefore, the bandwidth for the wasteful sequences can be deleted, and resources on the IEEE1394 bus can be used efficiently.

A general-use computer to which a computer program corresponding to the embodiment of the present invention is installed may execute the embodiments of the present invention.

In that case, the computer program corresponding to the embodiment of the present invention may be stored in a storage medium which the computer can read, such as a CD-ROM, a Floppy™ disc, etc. to be provided to a user.

The present invention has been described in connection with the preferred embodiments. The invention is not limited only to the above embodiments. It is apparent that various modifications, improvements, combinations, and the like can be made by those skilled in the art.

What are claimed are:

1. A data transmission apparatus connected via a bus to a network consisting of a plurality of data transmission apparatuses, the data transmission apparatus comprising:

a receiver receiving a request from a control node connected to the network to optimize transmission of a plurality of audio sequences in an isochronous data stream by decreasing the number of audio sequences in the isochronous data stream;

a duplicator duplicating, in accordance with the request, data transmitted by a transmission plug assigned to a first transmission sequence, said first transmission sequence being a last sequence of the data stream;

a transmitter transmitting the data duplicatively by using a second transmission sequence of which connection has not been established with a reception plug of a receiving node connected to the network and by using the first transmission sequence;

a terminator terminating transmission of the data of the first transmission sequence; and a releasing device releasing bandwidth used by the first transmission sequence on the bus.

2. The data transmission apparatus according to claim 1, wherein the receiver further receives a request for adding a new transmission sequence from the control node, and further comprising:

an obtaining device that obtains bandwidth for one sequence on the bus; and an adding device that adds a new transmission sequence using the obtained bandwidth.

3. The data transmission apparatus according to claim 1, wherein the network is based on IEEE 1394 Standards.

4. A computer readable storage medium storing a program, which a computer executes to realize a data transmission process in a network consisting of a plurality of data transmission apparatuses, said program comprising the instructions for:

(a) receiving a request from a control node connected to the network to optimize transmission of a plurality of audio sequences in an isochronous data stream by decreasing the number of audio sequences in the isochronous data stream;

(b) duplicating, in accordance with the request, data transmitted by a transmission plug assigned to a first transmission sequence, said first transmission sequence being a last sequence of the data stream;

(c) transmitting the data duplicatively by using a second transmission sequence of which connection has not been established with a reception plug of a receiving node connected to the network and by using the first transmission sequence;

(d) terminating transmission of the data of the first transmission sequence; and (e) releasing bandwidth used by the first transmission sequence on a bus.

5. The program according to claim 4, wherein the network is based on IEEE 1394 Standards.

* * * * *